(12) United States Patent
Merriman et al.

(10) Patent No.: US 9,461,343 B2
(45) Date of Patent: Oct. 4, 2016

(54) BATTERY CELL ASSEMBLY AND METHOD FOR MANUFACTURING A COOLING FIN FOR THE BATTERY CELL ASSEMBLY

(71) Applicant: LG Chem, Ltd., Seoul (KR)

(72) Inventors: Robert Merriman, Shelby Township, MI (US); Michael Nielson, Royal Oak, MI (US); Igor Isayev, Farmington Hills, MI (US); Satish Ketkar, Troy, MI (US)

(73) Assignee: LG Chem, Ltd., Seoul (KR)

( * ) Notice: Subject to any disclaimer, the term of this patent is extended or adjusted under 35 U.S.C. 154(b) by 199 days.

(21) Appl. No.: 14/488,349

(22) Filed: Sep. 17, 2014

(65) Prior Publication Data

US 2015/0000134 A1 Jan. 1, 2015

Related U.S. Application Data

(62) Division of application No. 13/475,963, filed on May 19, 2012, now Pat. No. 8,852,781.

(51) Int. Cl.
| | | |
|---|---|---|
| *H01M 10/6555* | (2014.01) | |
| *H01M 10/6557* | (2014.01) | |
| *H01M 10/647* | (2014.01) | |
| *B21D 53/08* | (2006.01) | |
| *B23P 15/26* | (2006.01) | |
| *H01M 10/60* | (2014.01) | |
| *H01M 10/6556* | (2014.01) | |
| *H01M 10/61* | (2014.01) | |
| *H01M 2/10* | (2006.01) | |

(52) U.S. Cl.
CPC ............. *H01M 10/50* (2013.01); *B21D 53/08* (2013.01); *B23P 15/26* (2013.01); *H01M 10/61* (2015.04); *H01M 10/647* (2015.04); *H01M 10/6555* (2015.04); *H01M 10/6556* (2015.04); *H01M 10/6557* (2015.04); *H01M 2/1077* (2013.01); *Y10T 29/49364* (2015.01)

(58) Field of Classification Search
None
See application file for complete search history.

(56) References Cited

U.S. PATENT DOCUMENTS

| | | | | |
|---|---|---|---|---|
| 5,731,568 A | * | 3/1998 | Malecek | ............ B60H 1/00278 180/68.5 |
| 6,703,160 B2 | * | 3/2004 | Gao | .................... H01M 2/1077 429/100 |
| 2003/0094263 A1 | * | 5/2003 | Garcia | ................ H01M 10/615 165/80.2 |
| 2004/0244954 A1 | * | 12/2004 | Goto | .................... F28D 1/05366 165/153 |
| 2013/0045410 A1 | * | 2/2013 | Yang | .................... H01M 10/625 429/120 |

FOREIGN PATENT DOCUMENTS

WO WO 2011/145830 * 11/2011

* cited by examiner

*Primary Examiner* — Jonathan Crepeau
(74) *Attorney, Agent, or Firm* — Buckert Patent & Trademark Law Firm, PC; John F. Buckert

(57) ABSTRACT

A battery cell assembly is provided. The battery cell assembly includes a cooling fin having a rectangular-shaped aluminum plate, a tube, and a flexible thermally conductive sheet. The plate has a first side and a second side. The tube is coupled to the first side of the plate and extends on at least first, second, and third peripheral edge portions of the plate. The flexible thermally conductive sheet is disposed on the first side of the plate. The battery cell assembly further includes a battery cell disposed against the flexible thermally conductive sheet of the cooling fin.

11 Claims, 9 Drawing Sheets

BATTERY CELL ASSEMBLY AND METHOD FOR MANUFACTURING A COOLING FIN FOR THE BATTERY CELL ASSEMBLY

CROSS-REFERENCE TO RELATED APPLICATIONS

This application is a divisional of U.S. patent application Ser. No. 13/475,963 filed on May 19, 2012, the entire contents of which are hereby incorporated by reference herein.

BACKGROUND

The inventors have recognized that during a brazing process of a cooling fin utilized in a battery cell assembly, a side of the cooling fin may have an abrasive residue formed thereon which can undesirably rub against an adjacent battery cell.

Accordingly, the inventors herein have recognized a need for an improved battery cell assembly and a method for manufacturing a cooling fin in the battery cell assembly that minimizes and/or eliminates the above-mentioned deficiency.

SUMMARY

A battery cell assembly in accordance with an exemplary embodiment is provided. The battery cell assembly includes a cooling fin having a generally rectangular-shaped aluminum plate, a tube, and a flexible thermally conductive sheet. The generally rectangular-shaped aluminum plate has a first side and a second side. The tube is coupled to the first side of the of the generally rectangular-shaped aluminum plate and extends on at least first, second, and third peripheral edge portions of the generally rectangular-shaped aluminum plate. The flexible thermally conductive sheet is disposed on the first side of the generally rectangular-shaped aluminum plate. The battery cell assembly further includes a battery cell disposed against the flexible thermally conductive sheet of the cooling fin.

A method for manufacturing a cooling fin for a battery cell assembly in accordance with another exemplary embodiment is provided. The method includes providing a generally rectangular-shaped aluminum plate, a tube, and a flexible thermally conductive sheet. The generally rectangular-shaped aluminum plate has a first side and a second side. The method further includes brazing the tube to the first side of the of the generally rectangular-shaped aluminum plate such that the tube extends on at least first, second, and third peripheral edge portions of the generally rectangular-shaped aluminum plate. The method further includes attaching the flexible thermally conductive sheet on the first side of the generally rectangular-shaped aluminum plate.

DETAILED DESCRIPTION

Figure 1:
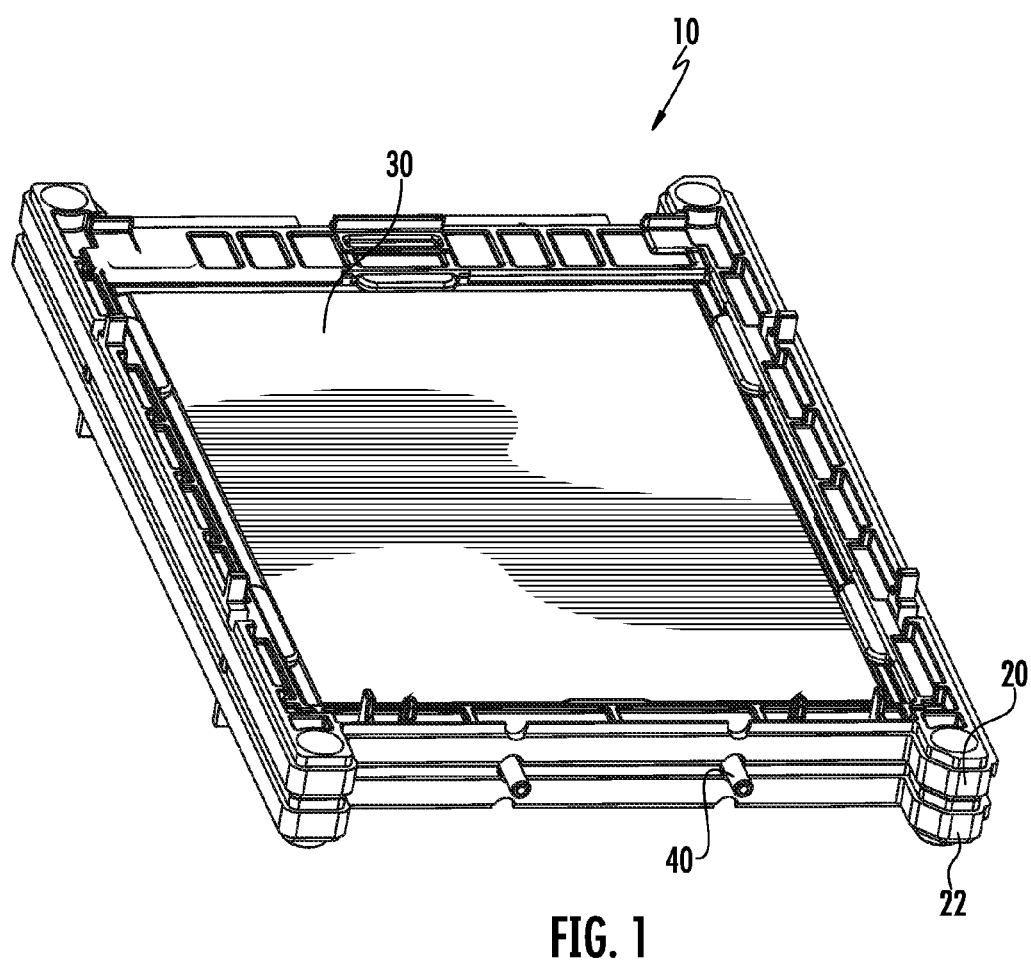
FIG. 1 is a schematic of a battery cell assembly in accordance with an exemplary embodiment.
Figure 2:
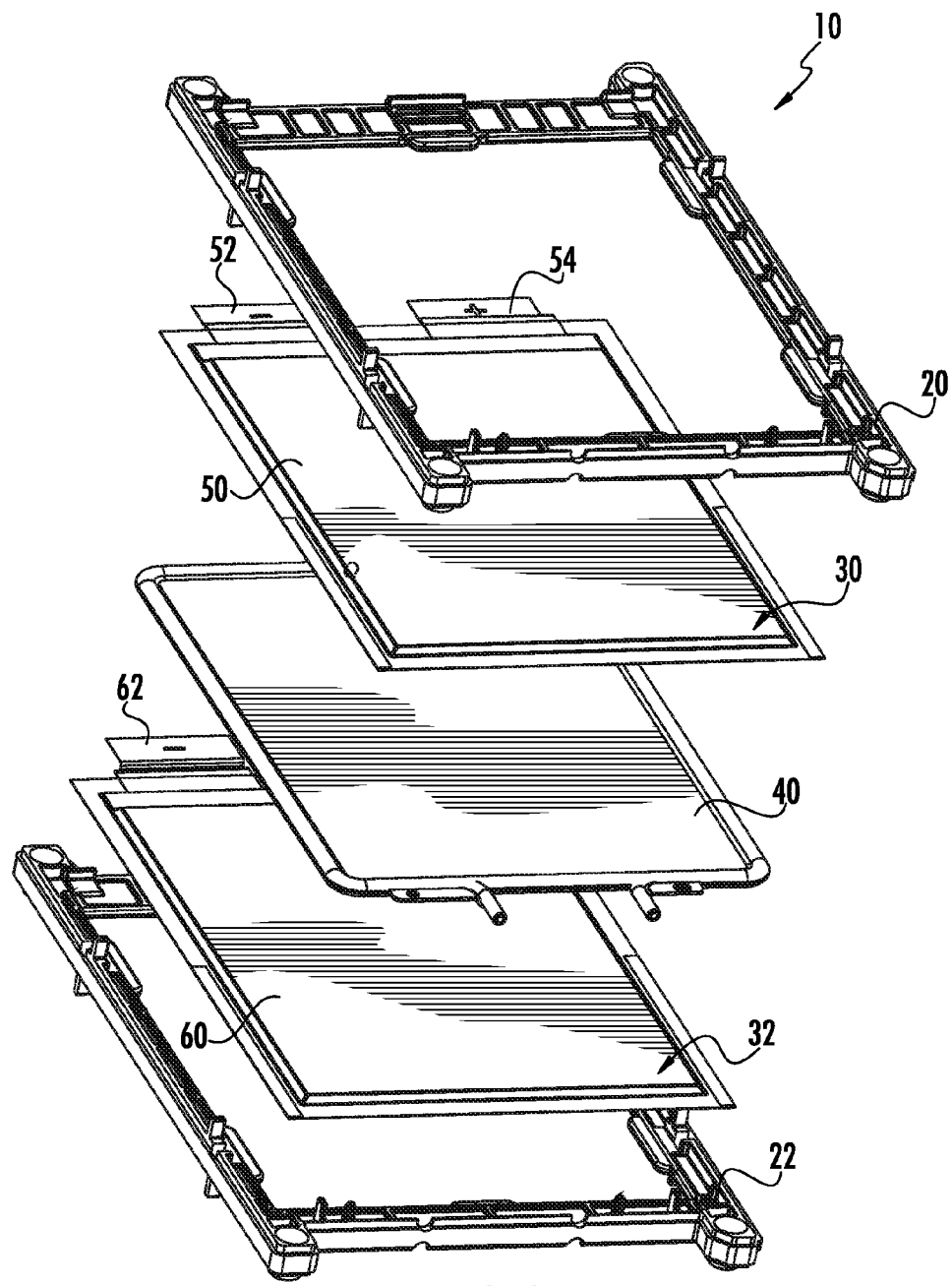
FIG. 2 is an exploded view of the battery cell assembly of FIG. 1.
Figure 3:
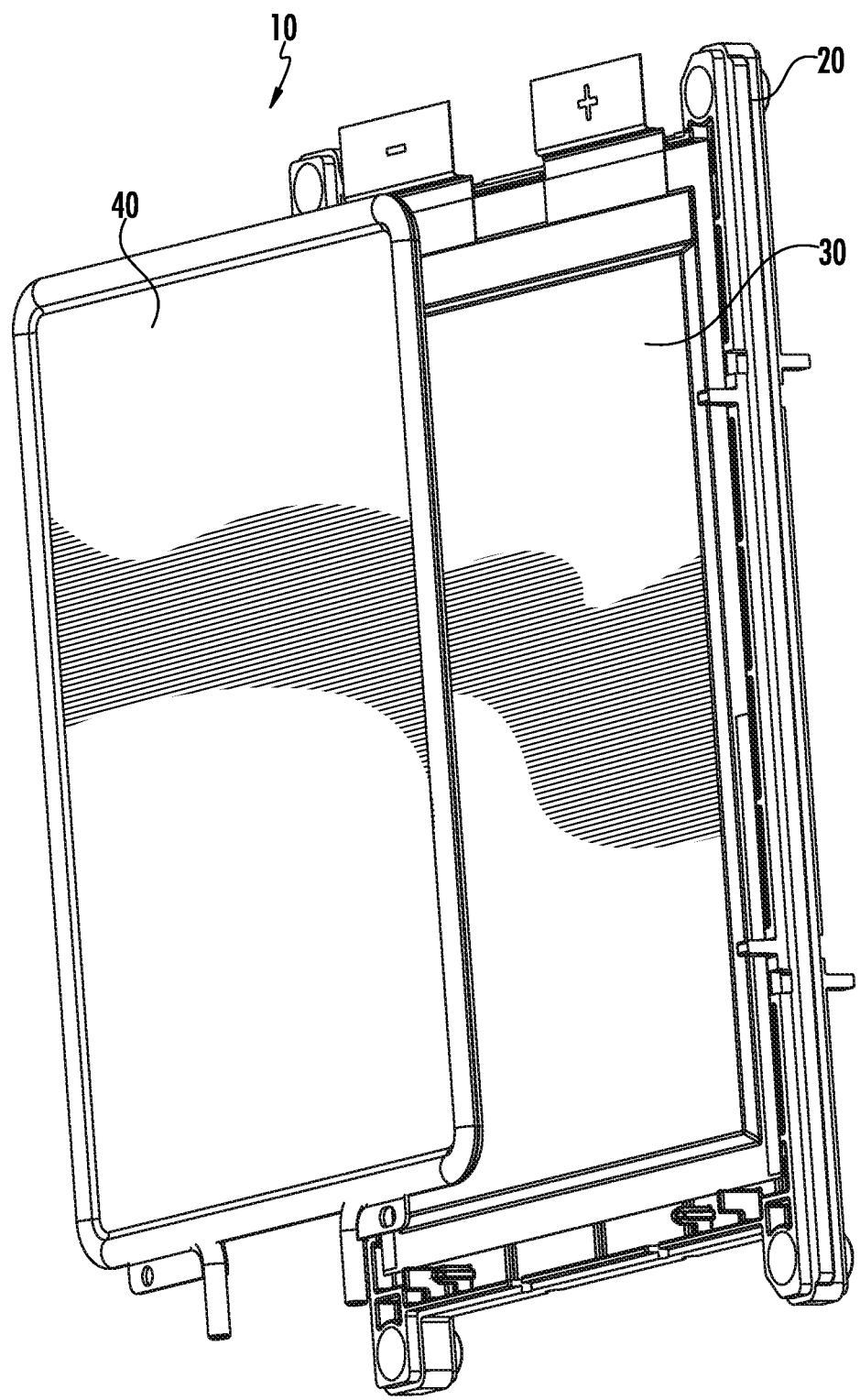
FIG. 3 is an exploded view of a portion of the battery cell assembly of FIG. 1.

Referring to FIGS. 1-5, a battery cell assembly 10 in accordance with an exemplary embodiment is provided. The battery cell assembly 10 includes rectangular ring-shaped frame members 20, 22, battery cells 30, 32, and a cooling fin 40. An advantage of the battery cell assembly 10 is that the assembly 10 utilizes a cooling fin 40 having a rectangular-shaped aluminum plate 80 with a flexible thermally conductive sheet 84 disposed thereon. As a result, a relatively rough surface on the aluminum plate due to a brazing process is covered by the flexible thermally conductive sheet 84 having a relatively smooth surface which is disposed against an adjacent battery cell and eliminates abrasive rubbing against the battery cell by the rough surface. Further, the flexible thermally conductive sheet 84 has excellent thermal characteristics for conducting heat energy from the battery cell to the aluminum plate 80.

The rectangular ring-shaped frame members 20, 22 are configured to be coupled together to hold the battery cells 30, 32 and the cooling fin 40 therebetween. In one exemplary embodiment, the rectangular ring-shaped frame members 20, 22 are constructed of plastic. However, in alternative embodiments, the rectangular ring-shaped frame members 20, 22 could be constructed of other materials known to those skilled in the art.

The battery cells 30, 32 are each configured to generate an operational voltage. In one exemplary embodiment, each of the battery cells 30, 32 are pouch-type lithium-ion battery cells. Of course, other types of battery cells known to those skilled in the art could be utilized. Also, in an exemplary embodiment, the battery cells 30, 32 are electrically coupled in series to one another.

The battery cell 30 includes a rectangular-shaped pouch 50 and electrodes 52, 54 extending from the pouch 50. The battery cell 30 is disposed between the rectangular ring-shaped frame member 20 and the cooling fin 40.

The battery cell 32 includes a rectangular-shaped pouch 60, an electrode 62 and another electrode (not shown). The battery cell 32 is disposed between the rectangular ring-shaped frame member 22 and the cooling fin 40.

Referring to FIGS. 2-7, the cooling fin 40 is provided to transfer heat energy from the battery cells 30, 32 to a refrigerant or a liquid flowing through the cooling fin 40 to cool the battery cells 30, 32. The cooling fin 40 includes a generally rectangular-shaped aluminum plate 80, a tube 82, and a flexible thermally conductive sheet 84.

The rectangular-shaped aluminum plate 80 has a first side 90 and a second side 92. The plate 80 further includes first, second, third, and fourth peripheral edge portions 100, 102, 104, 106 (shown in FIG. 5) that are each arcuate-shaped to hold a portion of the tube 82 thereon. In other words, the first, second, third, and fourth peripheral edge portions 100,

102, 104, 106 define an arcuate-shaped groove 109 (shown in FIG. 6) configured to receive the tube 82 thereon.

Figure 4:
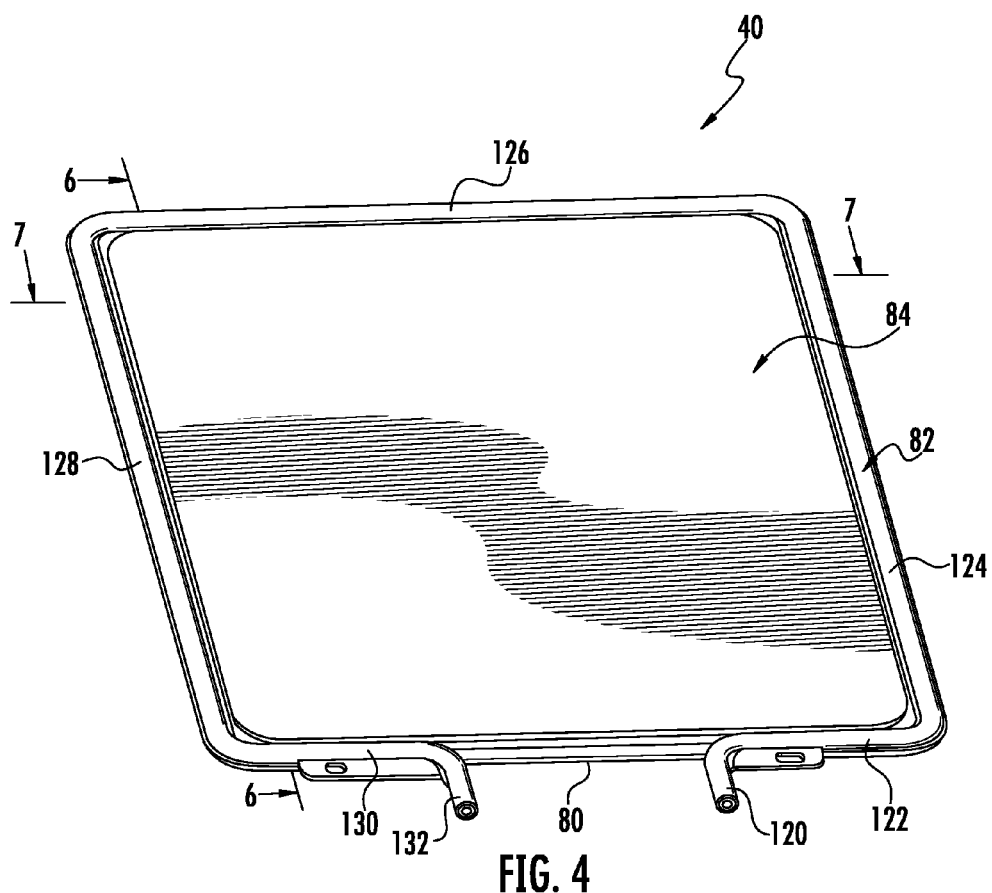
FIG. 4 is a schematic of a cooling fin utilized in the battery cell assembly of FIG. 1.

The tube 82 is coupled to the first side 90 of the generally rectangular-shaped aluminum plate 80, and is coupled to and extends on the first, second, third, and fourth peripheral edge portions 100, 102, 104, 106 of the plate 80. In one exemplary embodiment, the tube 82 is constructed of aluminum. However, the tube 82 could be constructed of other materials known to those skilled in the art. Referring to FIG. 4, the tube 82 includes an inlet port 120, tube portions 122, 124, 126, 128, 130, and an outlet port 132. The inlet port 120 is coupled to the tube portion 122. The tube portion 122 is coupled between the inlet port 120 and the tube portion 124. The tube portion 126 is coupled between the tube portion 124 and the tube portion 128. The tube portion 130 is coupled between the tube portion 128 and the outlet port 132.

Figure 5:
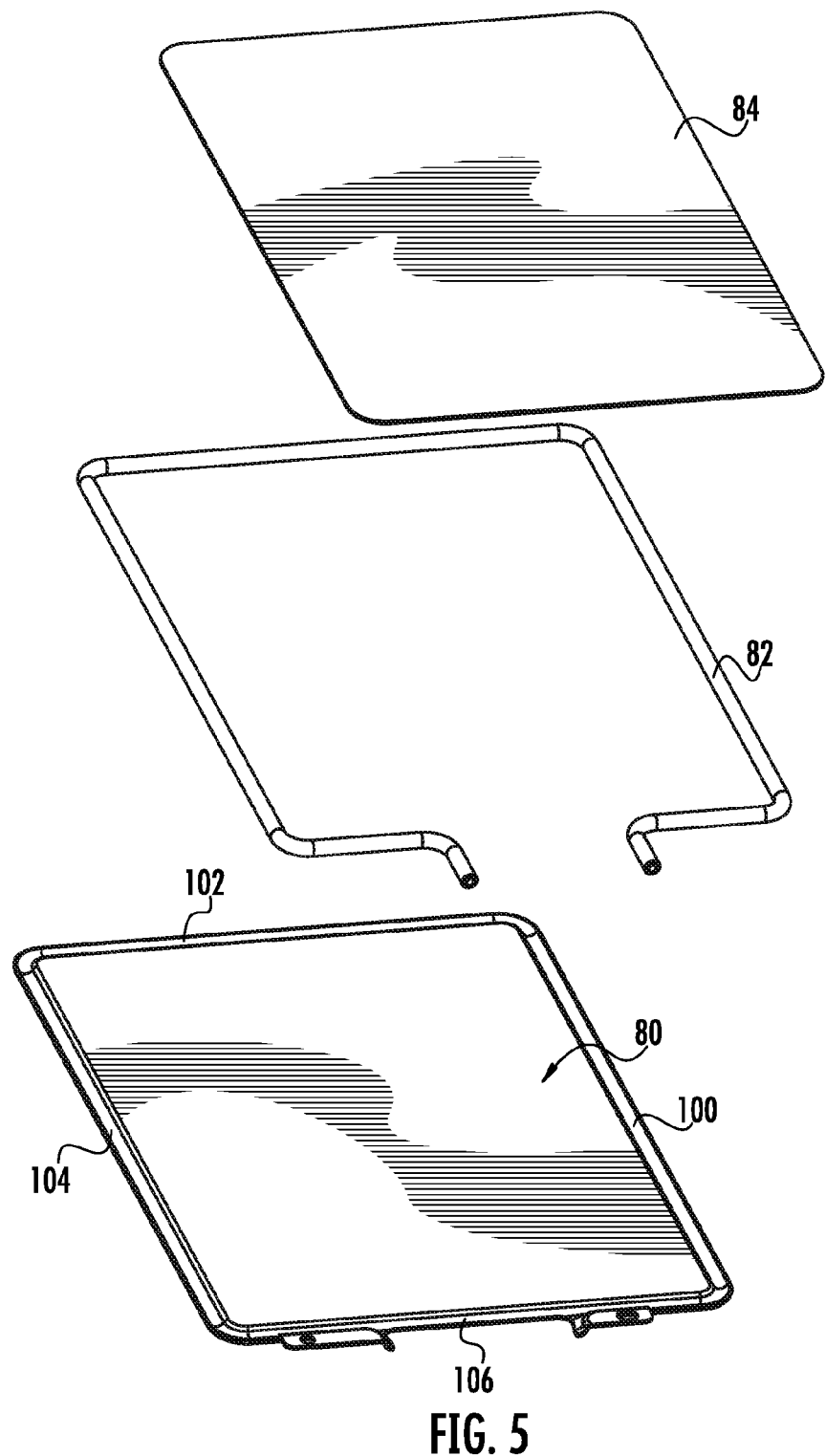
FIG. 5 is an exploded view of the cooling fin of FIG. 4.

Also, referring to FIGS. 4 and 5, the tube portion 122 is coupled to the fourth peripheral edge portion 106, and the tube portion 124 is coupled to the first peripheral edge portion 100, via brazing. The tube portion 126 is coupled to the second peripheral edge portion 102, and the tube portion 128 is coupled to the third peripheral edge portion 104, via brazing. Also, the tube portion 130 is coupled to the fourth peripheral edge portion 106 via brazing.

Figure 6:
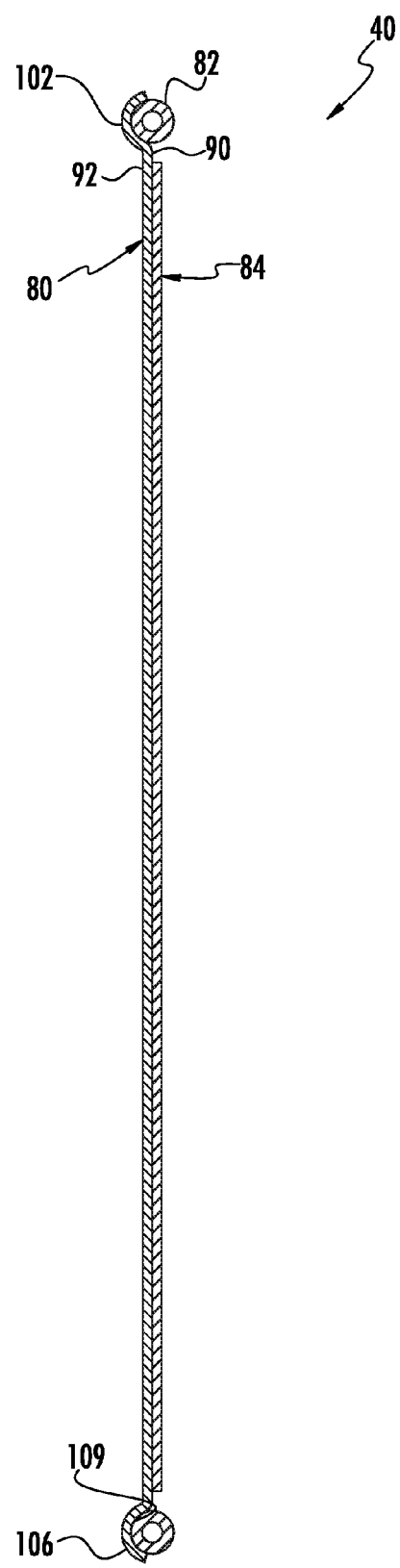
FIG. 6 is a cross-sectional view of a portion of the cooling fin of FIG. 4 taken along line 6-6.
Figure 7:
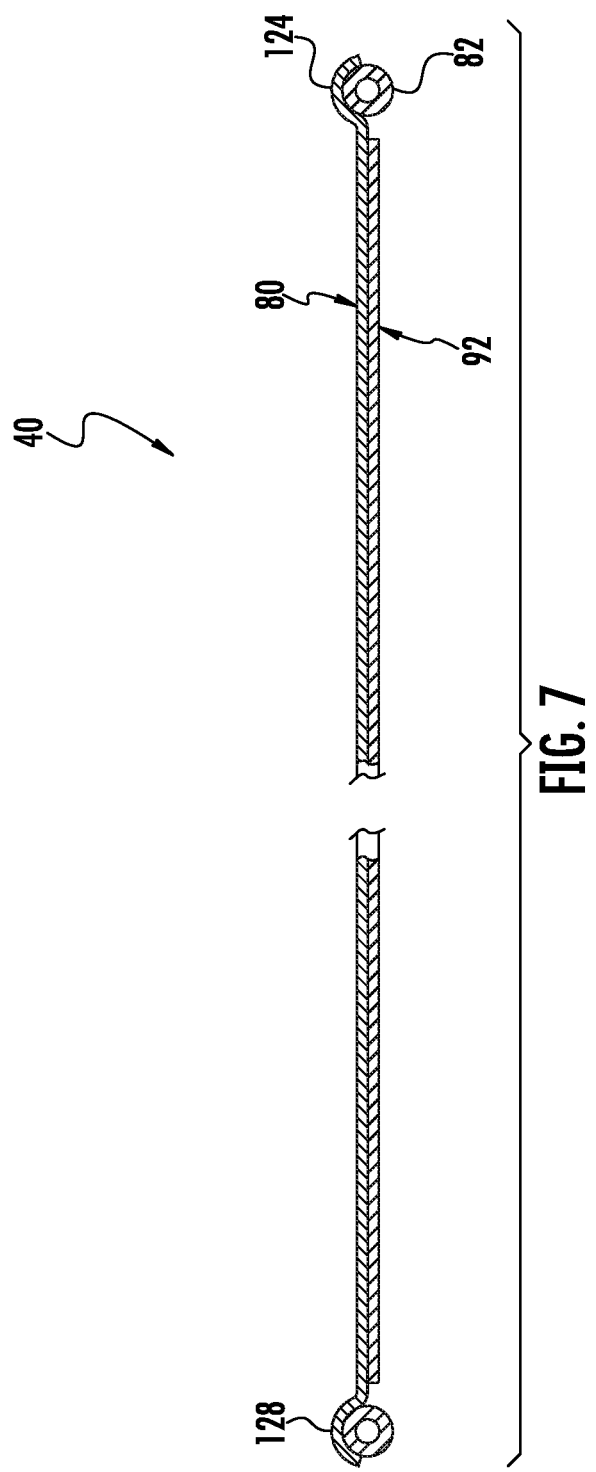
FIG. 7 is a cross-sectional view of a portion of the cooling fin of FIG. 4 taken along line 7-7.
Figure 8:
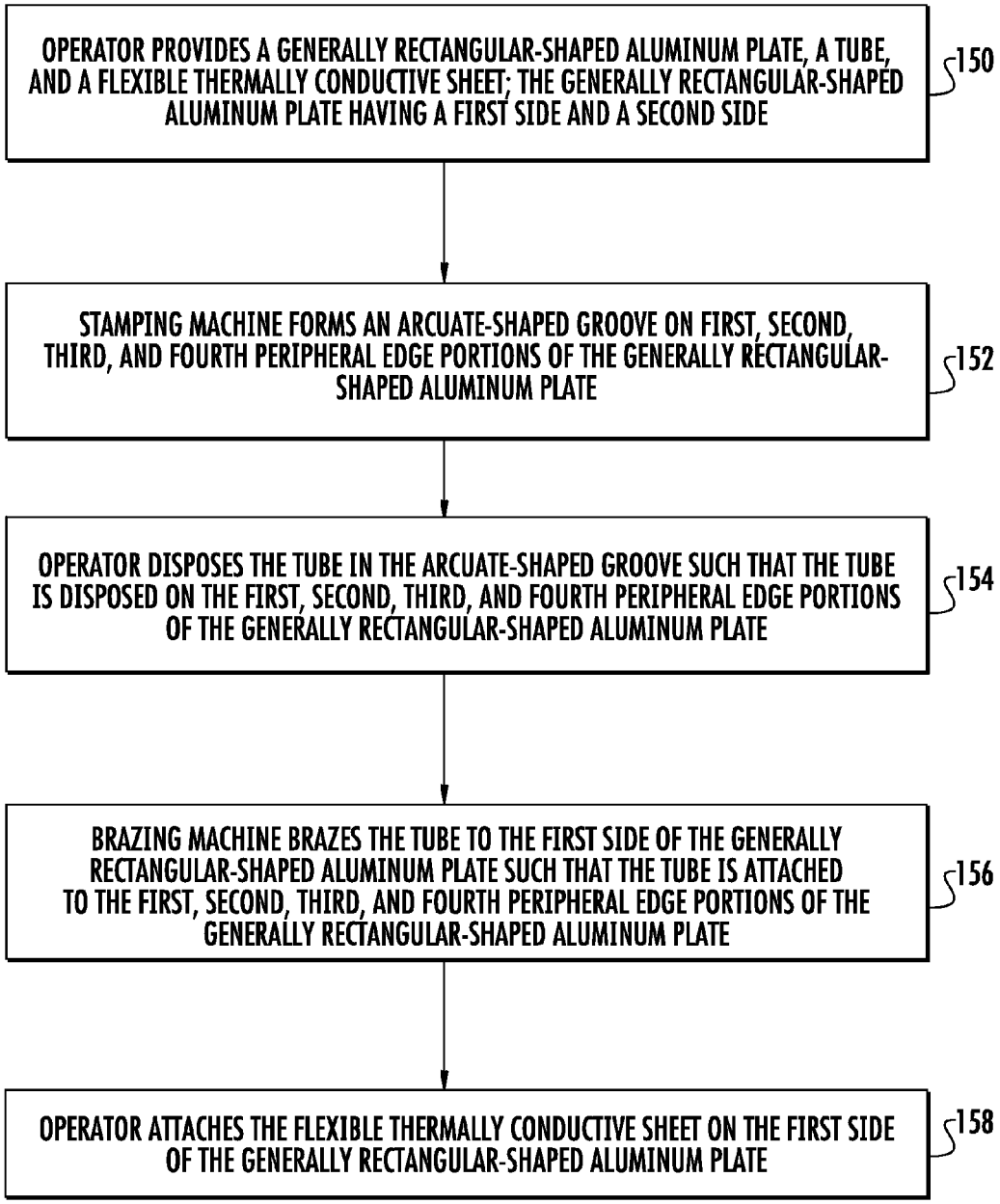
FIG. 8 is a flowchart of a method for manufacturing the cooling fin of FIG. 4 in accordance with another exemplary embodiment.
Figure 9:
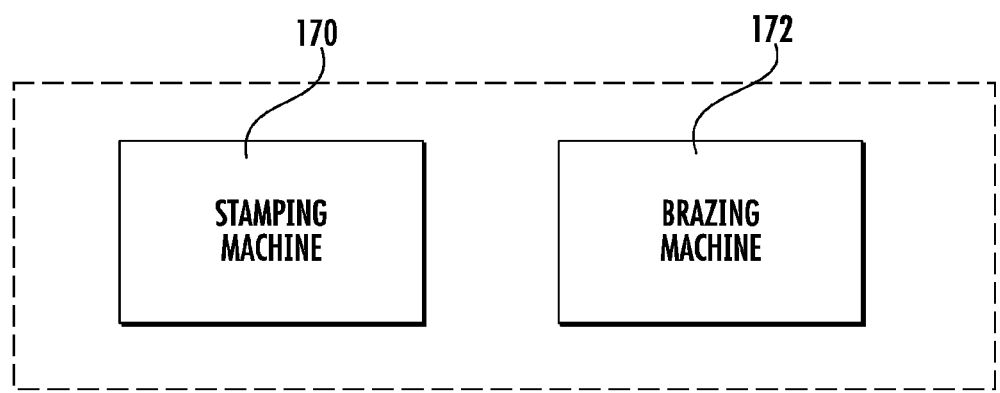
FIG. 9 is a block diagram of a stamping machine and a brazing machine utilized to manufacture the cooling fin of FIG. 4.
Figure 10:
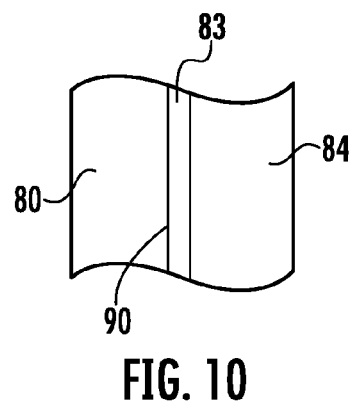
FIG. 10 is an enlarged cross-sectional view of a portion of the cooling fin of FIG. 4.

Referring to FIGS. 6 and 7, the flexible thermally conductive sheet 84 is disposed on the first side 90 of the generally rectangular-shaped aluminum plate 80. In one exemplary embodiment, the flexible thermally conductive sheet 84 comprises a flexible sheet constructed at least in part utilizing graphite having a thickness in a range of 0.25-0.5 millimeters. Further, the sheet 84 has an in-plane (e.g., planar with a surface of the sheet 84 contacting the plate 80) heat conductivity of greater than 200 Watts/meter—Kelvin. Also, in one exemplary embodiment, a side of the sheet 84 contacting the battery cell 30 has a roughness average (RA) in a range of 0.8-4.0 micro inches. Of course, in an alternative embodiment, the sheet 84 could have an RA less than 0.8 or greater than 4.0. Also, in one exemplary embodiment, the sheet 84 further includes a pressure sensitive adhesive 83 (shown in FIG. 10) disposed on one side of the sheet 84 that is used to attach the sheet 84 on the first side 90 of the plate 80 wherein the first side 90 has an abrasive brazing residue disposed thereon. Of course, in alternative embodiments, the sheet 84 could be coupled to the plate 80 utilizing other coupling devices known to those skilled in the art. Further, in one exemplary embodiment, the sheet 84 is generally rectangular-shaped and is sized to cover substantially all of a generally rectangular-shaped side surface of the battery cell 30. Of course, in alternative embodiments, the sheet 84 could have other shapes and sizes known to those skilled in the art. The sheet 84 is configured to transfer heat energy from the battery cell 30 to the generally rectangular-shaped aluminum plate 80. Further, the plate 80 is configured to transfer at least a portion of the heat energy to the tube 82. In particular, for example, the sheet 80 could comprise "Spreadershield SS-400" manufactured by GrafTech International Holdings Inc.

Referring to FIG. 4, during operation, a refrigerant or a liquid enters the inlet port 120 from a source device and flows through the tube portions 122, 124, 126, 128, 130 to the outlet port 132 and exits the outlet port 132 to a receiving device. Heat energy generated by the battery cell 30 is conducted through the flexible thermally conductive sheet 84 and the rectangular-shaped aluminum plate 80 to the tube 82. Further, heat energy generated by the battery cell 32 is conducted through the rectangular-shaped aluminum plate 80 to the tube 82. Further, the heat energy in the tube 82 is conducted into the refrigerant or the liquid flowing through the tube 82. Thus, the refrigerant or the liquid flowing through the tube 82 absorbs the heat energy from the battery cells 30, 32 to reduce a temperature of the battery cell 30, 32.

Referring to FIGS. 1, 5, 6, 8 and 9, a flowchart of a method for manufacturing the cooling fin 40 utilizing a stamping machine 170 and a brazing machine 172, in accordance with another exemplary embodiment will now be explained.

At step 150, an operator provides the generally rectangular-shaped aluminum plate 80, the tube 82, and the flexible thermally conductive sheet 84. The generally rectangular-shaped aluminum plate 80 has the first side 90 and the second side 92.

At step 152, the stamping machine 170 forms an arcuate-shaped groove 109 on the first, second, third, and fourth peripheral edge portions 100, 102, 104, 106 of the generally rectangular-shaped aluminum plate 80.

At step 154, the operator disposes the tube 82 in the arcuate-shaped groove 109 such that the tube 82 is disposed on the first, second, third, and fourth peripheral edge portions 100, 102, 104, 106 of the generally rectangular-shaped aluminum plate 82.

At step 156, the brazing machine 172 brazes the tube 82 to the first side 90 of the generally rectangular-shaped aluminum plate 80 such that the tube 82 is attached to the first, second, third, and fourth peripheral edge portions 100, 102, 104, 106 of the generally rectangular-shaped aluminum plate 82.

At step 158, the operator attaches the flexible thermally conductive sheet 84 on the first side 90 of the generally rectangular-shaped aluminum plate 80.

The battery cell assembly 10 and the method for manufacturing the cooling fin 40 provide a substantial advantage over other battery cell assemblies and methods. In particular, the battery cell assembly 10 and the method provide a technical effect of utilizing a cooling fin 40 with a flexible thermally conductive sheet 84 disposed on a relatively rough surface of the cooling fin 40 such that the flexible thermally conductive sheet 84 is disposed against the adjacent battery cell to prevent abrasive rubbing of the rough surface against the battery cell.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A method for manufacturing a cooling fin for a battery cell assembly, comprising:

providing a generally rectangular-shaped aluminum plate, a tube, and a flexible thermally conductive graphite sheet; the generally rectangular-shaped aluminum plate having a first side and a second side, the flexible thermally conductive graphite sheet having an adhesive disposed on one side of the flexible thermally conductive graphite sheet;

brazing the tube to the first side of the of the generally rectangular-shaped aluminum plate such that the tube extends on at least first, second, and third peripheral edge portions of the generally rectangular-shaped aluminum plate; and disposing the flexible thermally conductive graphite sheet on the first side of the generally rectangular-shaped aluminum plate such that the adhesive couples the flexible thermally conductive graphite sheet to the generally rectangular-shaped aluminum plate.

2. The method of claim 1, further comprising:

forming an arcuate-shaped groove on the first, second, and third peripheral edge portions of the generally rectangular-shaped aluminum plate; and disposing the tube in the arcuate-shaped groove.

3. The method of claim 1, wherein the flexible thermally conductive sheet has a roughness average in a range of 0.8-4.0 micro-inches.

4. The method of claim 1, wherein the flexible thermally conductive graphite sheet has a heat conductivity greater than 200 Watts/meter —Kelvin in a direction planar with a surface of the flexible thermally conductive graphite sheet.

5. The method of claim 1, wherein the adhesive is a pressure sensitive adhesive.

6. A method for manufacturing a cooling fin for a battery cell assembly, comprising:

providing an aluminum plate, a tube, and a flexible thermally conductive graphite sheet; the aluminum plate having a first side and a second side, the flexible thermally conductive graphite sheet having an adhesive disposed on one side of the flexible thermally conductive graphite sheet;

attaching the tube to the first side of the aluminum plate such that the tube extends on an edge portion of the aluminum plate; and disposing the adhesive of the flexible thermally conductive graphite sheet directly on the first side of the aluminum plate such that the adhesive couples the flexible thermally conductive graphite sheet to the first side of the aluminum plate.

7. The method of claim 6, further comprising:

forming an arcuate-shaped groove on the edge portion of the aluminum plate; and disposing the tube in the arcuate-shaped groove.

8. The method of claim 6, wherein the flexible thermally conductive sheet has a roughness average in a range of 0.8-4.0 micro-inches.

9. The method of claim 6, wherein the aluminum plate is a generally rectangular-shaped aluminum plate.

10. The method of claim 6, wherein the flexible thermally conductive graphite sheet has a heat conductivity greater than 200 Watts/meter—Kelvin in a direction planar with a surface of the flexible thermally conductive graphite sheet.

11. The method of claim 6, wherein the adhesive is a pressure sensitive adhesive.

\* \* \* \* \*